(12) United States Patent
Barber et al.

(10) Patent No.: US 6,808,219 B2
(45) Date of Patent: Oct. 26, 2004

(54) DETACHABLE WINDSHIELD FOR A MOTORCYCLE

(75) Inventors: Jonathan N. Barber, Waukesha, WI (US); Christopher J. Butkiewicz, Beaver Dam, WI (US)

(73) Assignee: Harley-Davidson Motor Company Group, Inc., Milwaukee, WI (US)

( * ) Notice: Subject to any disclaimer, the term of this patent is extended or adjusted under 35 U.S.C. 154(b) by 0 days.

(21) Appl. No.: 10/813,404

(22) Filed: Mar. 30, 2004

(65) Prior Publication Data

US 2004/0183332 A1 Sep. 23, 2004

Related U.S. Application Data

(63) Continuation of application No. 10/383,778, filed on Mar. 7, 2003, now Pat. No. 6,736,441.

(51) Int. Cl.[7] .............................................. B62J 23/00
(52) U.S. Cl. .................................... 296/78.1; 296/96.21
(58) Field of Search ............................ 296/78.1, 96.21, 296/84.1, 180.1, 77.1, 102, 217, 91, 95.1; 224/420, 448; 248/549; 280/288.4

(56) References Cited

U.S. PATENT DOCUMENTS

| | | | |
|---|---|---|---|
| 2,675,266 A | | 4/1954 | Comiskey Sr. |
| 3,369,836 A | | 2/1968 | Haycock et al. |
| 3,801,152 A | | 4/1974 | Tims et al. |
| 3,904,238 A | | 9/1975 | Anderson et al. |
| 4,019,774 A | | 4/1977 | Tsukahara et al. |
| 4,226,463 A | | 10/1980 | Gager, Jr. |
| 4,252,290 A | * | 2/1981 | Willey ........................ 248/549 |
| 4,269,445 A | | 5/1981 | Gager, Jr. |
| 4,379,584 A | | 4/1983 | Willey |
| 4,460,158 A | | 7/1984 | Chiesa et al. |
| 4,479,663 A | * | 10/1984 | Morris et al. ............... 296/78.1 |
| 4,489,973 A | * | 12/1984 | Willey ........................ 296/78.1 |
| 4,830,423 A | | 5/1989 | Nebu et al. |
| 5,658,035 A | | 8/1997 | Armstrong |
| 5,732,965 A | * | 3/1998 | Willey ........................ 296/78.1 |
| 5,788,313 A | * | 8/1998 | Willey ........................ 296/78.1 |
| 5,853,217 A | | 12/1998 | Armstrong |
| 5,988,727 A | * | 11/1999 | Mueller ...................... 296/78.1 |
| 6,176,538 B1 | * | 1/2001 | Lawson et al. ............. 296/78.1 |
| 6,196,614 B1 | * | 3/2001 | Willey ........................ 296/78.1 |
| 6,203,093 B1 | * | 3/2001 | Suzuki et al. .............. 296/78.1 |
| 6,231,104 B1 | | 5/2001 | Roethel |
| 6,254,166 B1 | * | 7/2001 | Willey ........................ 296/78.1 |
| 6,505,877 B1 | | 1/2003 | Devlin et al. |
| 6,606,778 B1 | * | 8/2003 | Krass et al. ............. 296/96.21 |
| 6,631,656 B2 | * | 10/2003 | Ase et al. ................. 74/551.8 |
| 2003/0052031 A1 | | 3/2003 | Poore |
| 2003/0111822 A1 | | 6/2003 | Goldammer et al. |
| 2003/0168485 A1 | | 9/2003 | Mahoney et al. |

FOREIGN PATENT DOCUMENTS

WO    WO02/074614    9/2002

* cited by examiner

Primary Examiner—Kiran Patel
(74) Attorney, Agent, or Firm—Michael Best & Friedrich LLP

(57) ABSTRACT

A detachable windshield assembly for a motorcycle including at least one clamp coupled to the windshield. The clamp is securable to the motorcycle in a secured condition and releasable from the motorcycle in an unsecured condition. The clamp includes a linkage movable between first and second positions such that the clamp is in the unsecured condition when the linkage is in the first position and the clamp is in the secured condition when the linkage is in the second position. The linkage has a center position and the clamp is biased toward the unsecured condition when the linkage is over center in a first direction and the clamp is biased toward the secured condition when the linkage is over center in the opposite direction.

25 Claims, 5 Drawing Sheets

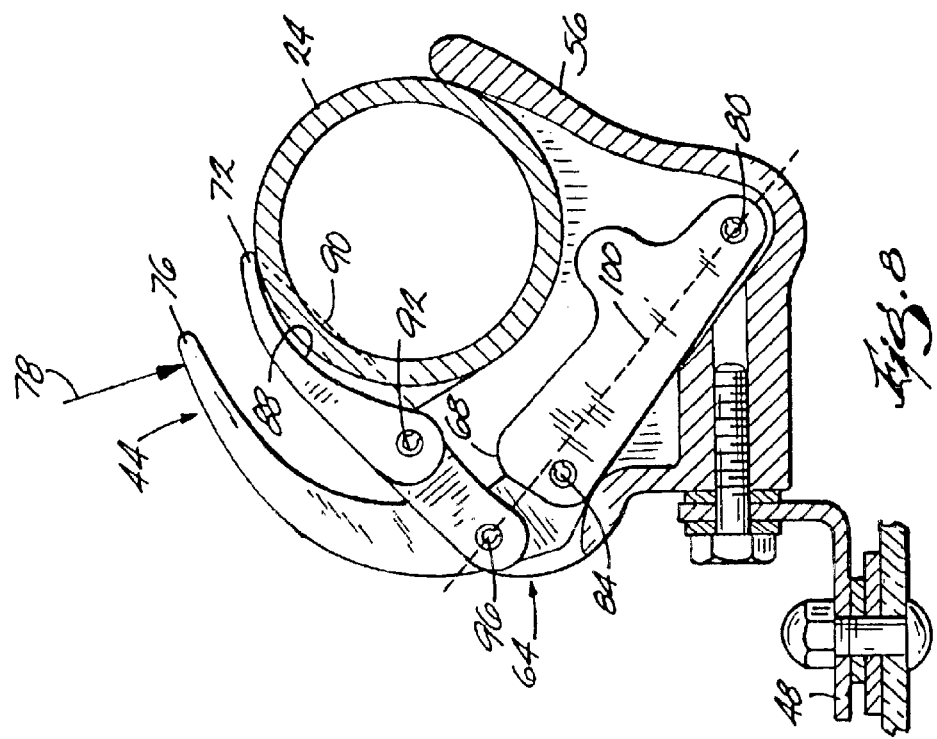
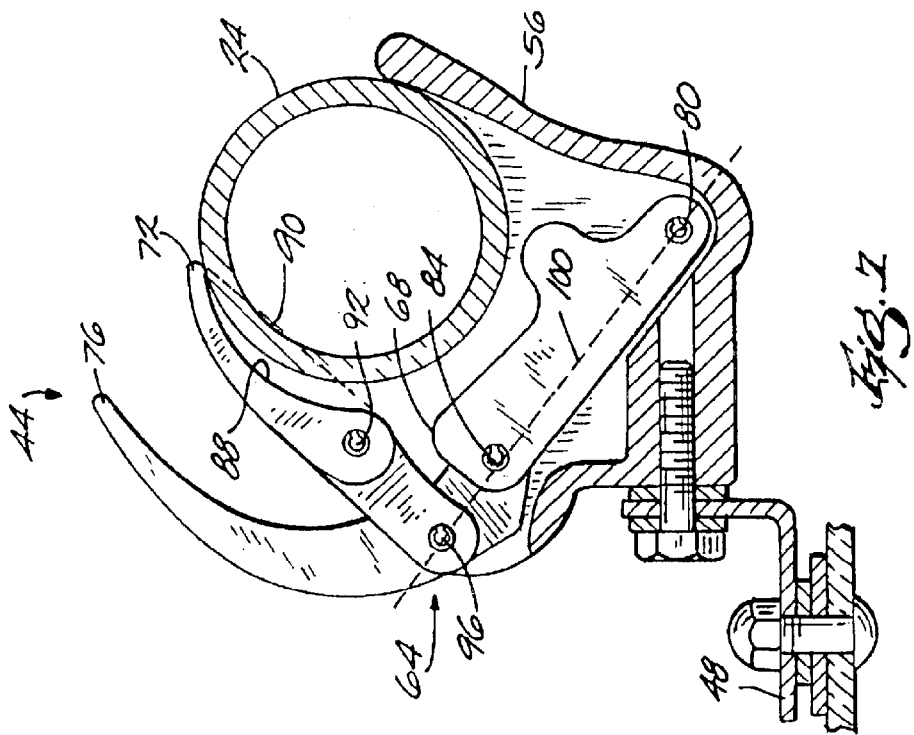

DETACHABLE WINDSHIELD FOR A MOTORCYCLE

CROSS-REFERENCE TO RELATED APPLICATIONS

This application is a continuation of U.S. patent application Ser. No. 10/383,778, filed Mar. 7, 2003, now U.S. Pat. No. 6,736,441, the entire contents of which is incorporated by reference herein.

FIELD OF THE INVENTION

The invention relates to motorcycles, and more particularly to detachable windshield assemblies for motorcycles.

BACKGROUND OF THE INVENTION

Windshields are used on motorcycles to block the wind for the comfort of the rider. It is known in the art to make a windshield detachable in case the rider prefers not to use a windshield. Some known windshields use bolts that require the use of tools to remove the windshield from the motorcycle. Other known windshields are removable without the use of tools, but typically include additional hardware that remains fixed to the motorcycle after the windshield is removed.

SUMMARY OF THE INVENTION

The present invention provides a windshield assembly that can be installed onto and removed from a motorcycle without tools and without the need for additional hardware remaining fixed to the motorcycle. In one aspect, the windshield assembly includes a windshield and at least one clamp coupled to the windshield. The clamp can be secured to the motorcycle in a secured condition and released from the motorcycle in an unsecured condition. The clamp includes a linkage that is movable between first and second positions that correlate with the unsecured and secured conditions of the clamp, respectively.

Other features and advantages of the invention will become apparent to those skilled in the art upon review of the following detailed description, claims, and drawings.

BRIEF DESCRIPTION OF THE DRAWINGS

FIG. 7 is a view similar to FIG. 5, illustrating the clamp moving further toward the secured condition.

FIG. 8 is a view similar to FIG. 5, illustrating the clamp in the secured condition.

Figure 1:
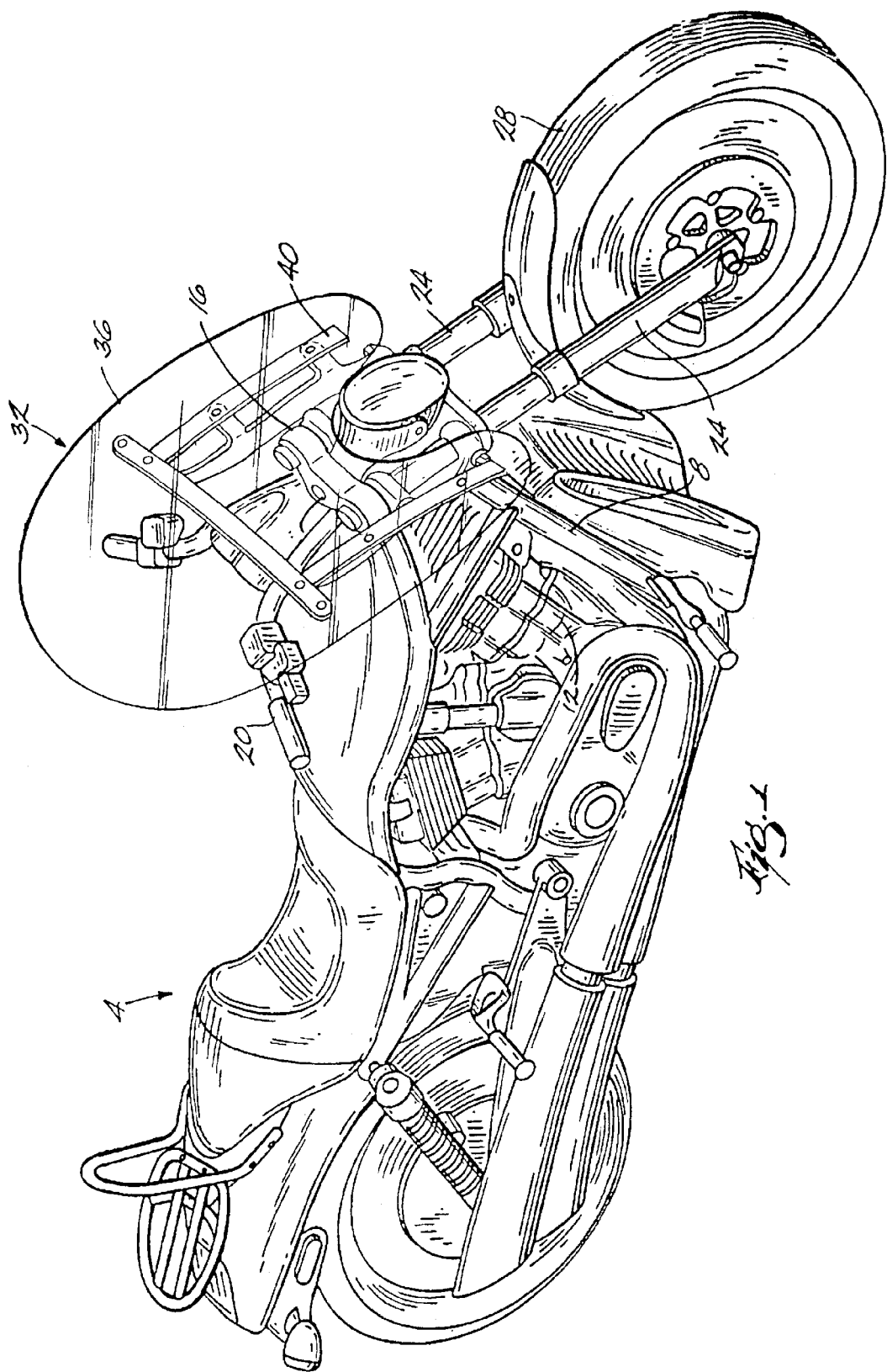
FIG. 1 is a perspective view of a motorcycle with a windshield assembly according to one embodiment of the present invention.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items.

DETAILED DESCRIPTION OF THE PREFERRED EMBODIMENT

FIG. 1 illustrates a motorcycle 4 embodying the present invention. The motorcycle 4 has a frame 8, an engine 12 connected to the frame 8, a triple tree 16 coupled to the frame 8, handlebars 20 coupled to the triple tree 16, fork tubes 24 coupled to the triple tree 16, and a front wheel 28 coupled to the fork tubes 24. The motorcycle 4 also includes a windshield assembly 32 releasably connected to the fork tubes 24. Although the windshield assembly 32 of the illustrated embodiment is shown connected to the fork tubes 24, the windshield assembly 32 can also be releasably connected to the triple tree 16, the handlebars 20, or any combination thereof. In the illustrated embodiment, the windshield assembly 32 can be directly secured to the motorcycle 4. This means that there is no hardware secured to the motorcycle 4 upon which the windshield assembly 32 must be mounted, nor is there any hardware that remains on the motorcycle 4 when the windshield assembly 32 is removed from the motorcycle 4.

Figure 2:
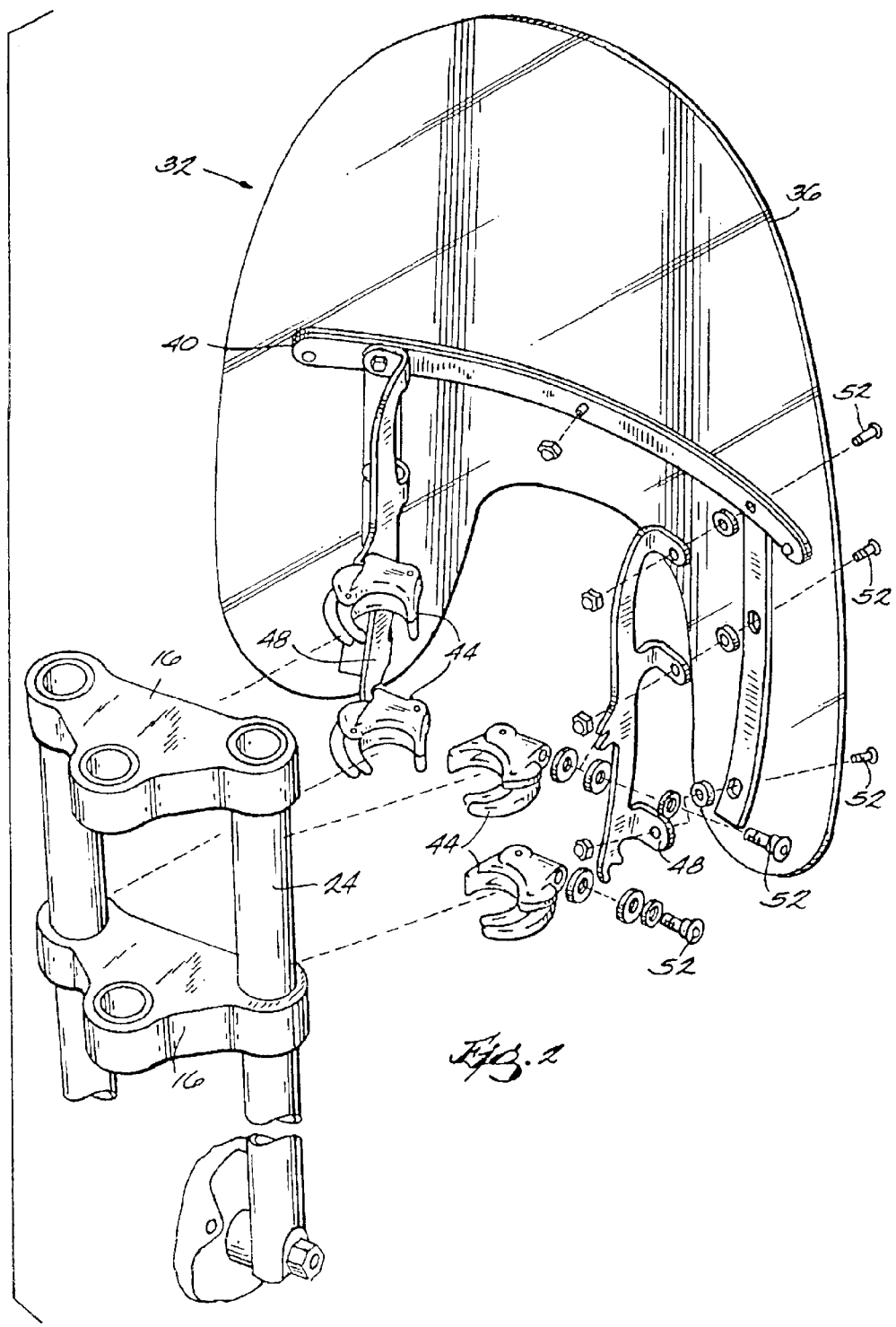
FIG. 2 is a partial exploded view of the windshield assembly shown in FIG. 1.

FIG. 2 illustrates the windshield assembly 32 in more detail. As illustrated, the windshield assembly 32 includes a windshield 36, a windshield frame 40, and clamps 44 coupled to the windshield frame 40. Each clamp 44 is coupled to a clamping bracket 48 using fasteners, shown in FIG. 2 as threaded bolts 52. One of skill in the art would understand that the windshield assembly 32 need not have a windshield frame 40 to fall within the scope of the present invention. In this configuration, the clamps 44 would be directly coupled to the windshield 36.

In the illustrated embodiment, four clamps 44 are shown coupled to the windshield 36 but it should be understood that other numbers of clamps 44 may be used. Preferably, the clamps 44 are made of metal. However, the clamps 44 could be made of plastic, hardened rubber, or any other suitable material. The clamps 44 are identical and thus the description below applies to all of the clamps 44.

FIGS. 3-8 show the clamp 44 in more detail. Each clamp 44 includes a housing 56 having a receiving portion 60 capable of at least partially receiving the fork tube 24. In the illustrated embodiment, the receiving portion 60 is arcuate (see FIG. 5). The clamp 44 also includes a linkage 64 having a link 68, a jaw 72, and a lever 76, best illustrated in FIG. 5. The term "linkage," as used within the description and claims, is meant to include all assemblies which include a series of parts that are coupled for relative movement with respect to each other.

The link 68 is pivotably coupled to the clamp housing 56 about a first axis 80. The lever 76 is pivotably coupled to the link 68 about a second axis 84. The jaw 72 includes an arcuate portion 88 and is pivotably coupled to the housing 56 about a third axis 92 and pivotably coupled to the lever 76 about a fourth axis 96. The first axis 80 and the fourth axis 96 define a center line 100 of the linkage 64, best shown in shadow in FIG. 7. As shown in FIGS. 5-8, actuating the clamp 44 moves the second axis 84 into an over center position relative to the center line 100.

Figure 3:
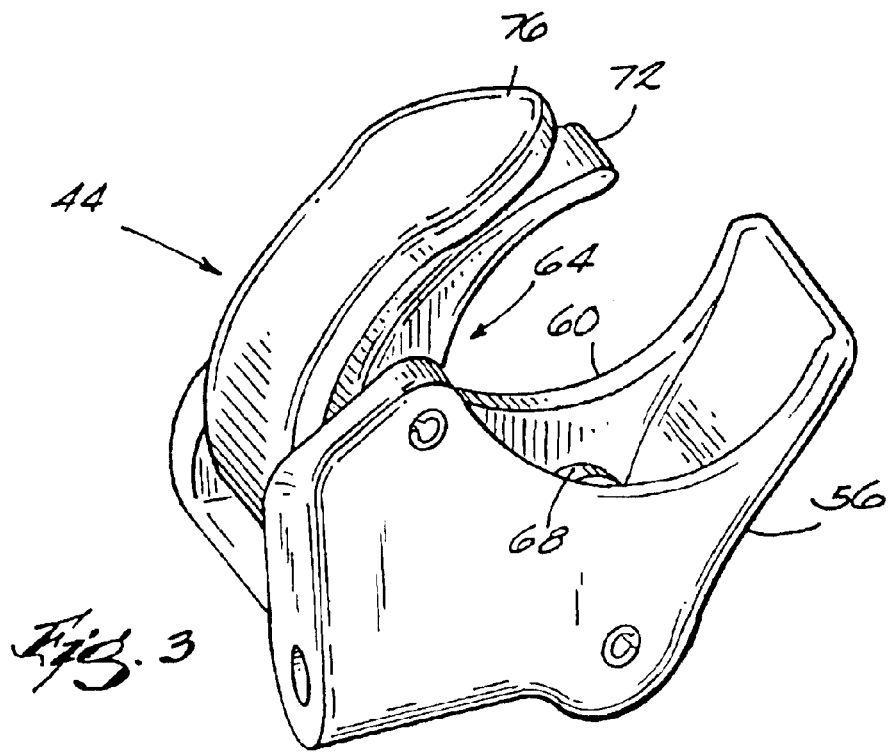
FIG. 3 is an enlarged perspective view of a clamp of the windshield assembly shown in FIG. 1, illustrating the clamp in the secured condition.
Figure 4:
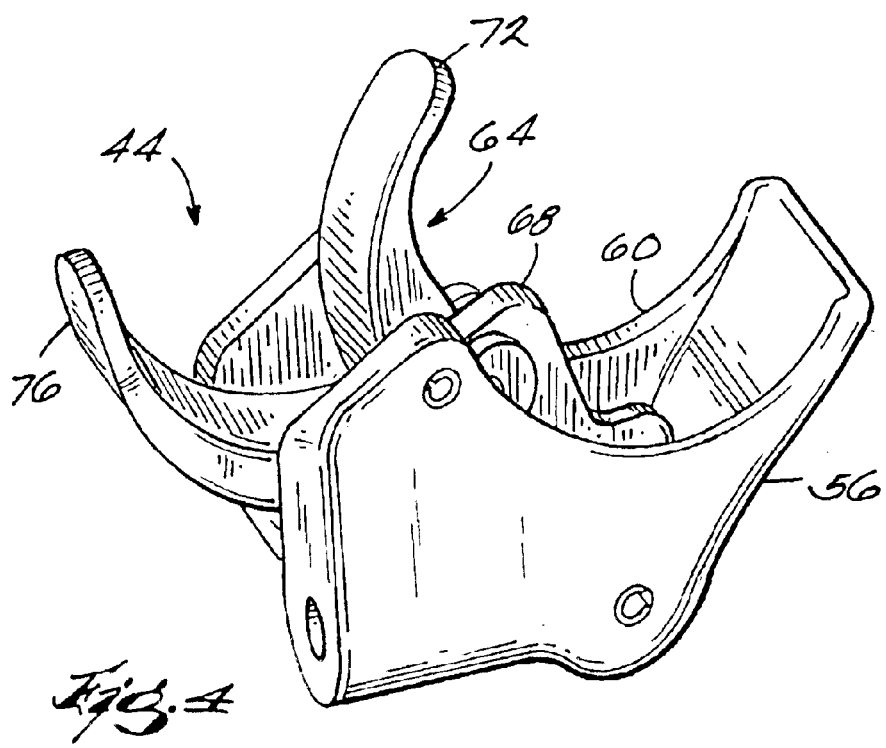
FIG. 4 is a view similar to FIG. 3, illustrating the clamp in the unsecured condition.
Figure 5:
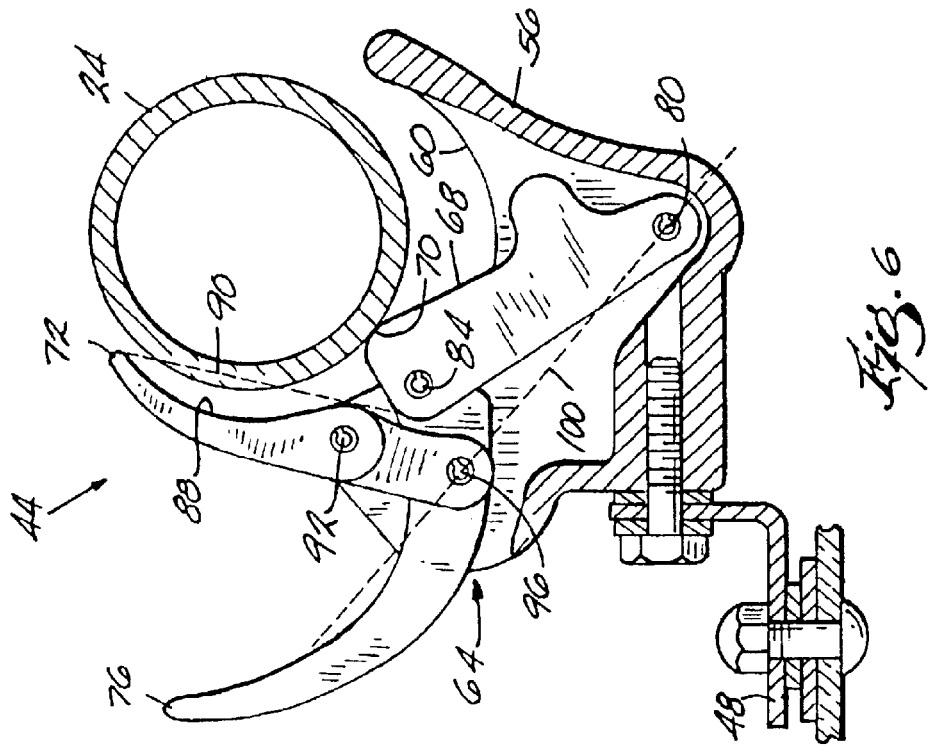
FIG. 5 is a section view of the clamp shown in FIG. 3, illustrating the clamp in the unsecured condition.

The clamps 44 are movable between an unsecured condition, illustrated in FIGS. 4 and 5, and a secured condition, illustrated in FIGS. 3 and 8. Correspondingly, the linkage 64 is movable between a first position, illustrated in FIG. 4, and a second position, illustrated in FIG. 3. Moving the lever 76 manually actuates the linkage 64 between the first and second positions. The jaw 72 is movable to receive the fork tube 24 when the linkage 64 is moved from the first to the second position and movable to release the fork tube 24 when the linkage 64 is moved from the second to the first position. As used in the claims and the specification, something is "received" within the jaw 72 when it breaks a plane 90 formed by the arcuate portion 88 of the jaw 72 (shown in FIGS. 5-8). Similarly, something is received within any element when it breaks a plane defined by the ends of an arcuate portion defined by that element.

Figure 6:
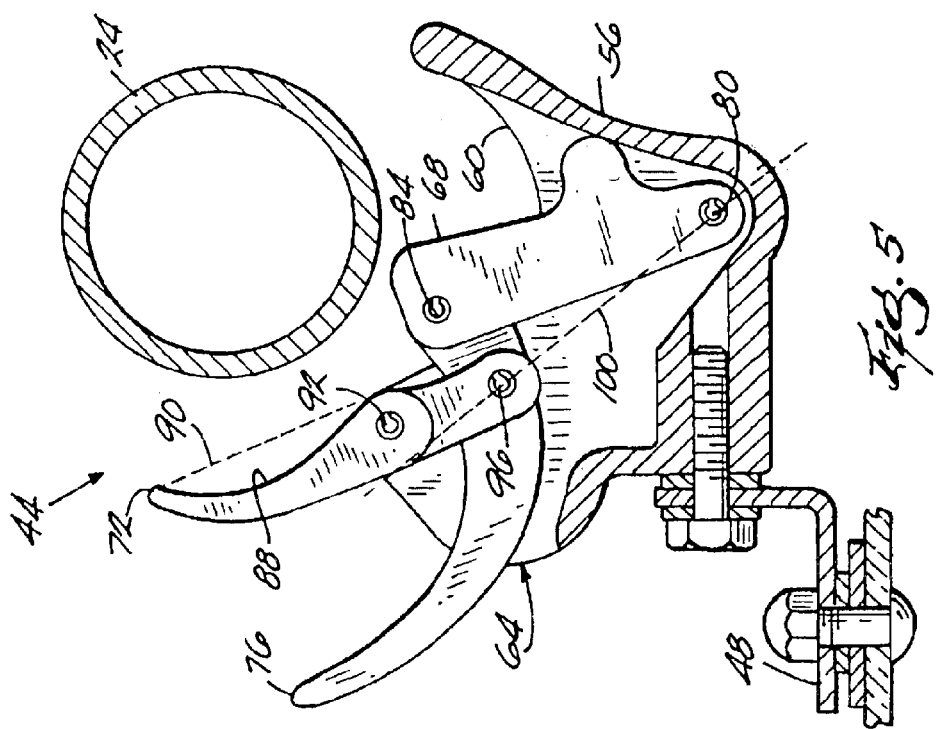
FIG. 6 is a view similar to FIG. 5, illustrating the clamp moving toward the secured condition.

As illustrated in FIGS. 5 and 6, the linkage 64 is biased by the fork tube 24 toward the first position when the second axis 84 is over center in one direction. As shown in FIG. 8, the linkage 64 is biased toward the second position when the second axis 84 is over center in the opposite direction. The illustrated over center linkage is only one possible over center linkage that can be used with the windshield assembly 32 of the present invention. It is understood that other over center linkages are known to those of ordinary skill in the art and that other over center linkages can be used with the windshield assembly 32 and remain within the scope of the present invention.

FIG. 5 illustrates the clamp 44 in the unsecured condition, with the linkage 64 in the first position as the fork tube 24 of the motorcycle 4 is inserted into the clamp 44. The lever 76 is movable to manually actuate the linkage 64 between the second position to secure the fork tube 24 within the clamp 44 (FIG. 8) and the first position to release the fork tube 24 from the clamp 44 (FIG. 5).

As illustrated in FIG. 6, inserting the fork tube 24 into the clamp 44 engages the link 68 at an engagement point 70 thereby moving the linkage 64 toward the second position. The operator of the motorcycle 4 can further assist this process by manually actuating the lever 76 toward the second position as the fork tube 24 engages the link 68. As the fork tube 24 is further inserted into the clamp 44 and the operator moves the lever 76, the second axis 84 aligns with the center line 100, as illustrated in FIG. 7. Finally, FIG. 8 illustrates the clamp 44 after it has been moved to the secured condition by the operator moving the lever 76 in the direction indicated by arrow 78. In this condition, the second axis 84 is positioned over center, biasing the linkage 64 toward the second position. Thus, the windshield 36 is secured to the motorcycle 4. To remove the windshield 36 from the motorcycle 4, simply reverse the process and actuate the lever 76 toward the first position until the clamp 44 is in the unsecured condition and remove the clamp 44 from the fork tube 24.

The embodiments described above and illustrated in the drawings are presented by way of example only and are not intended as a limitation upon the concepts and principles of the present invention. As such, one having ordinary skill in the art will appreciate that various changes in the elements and their configuration and arrangement are possible without departing from the spirit and scope of the present invention as set forth in the following claims.

We claim:

1. A windshield assembly for a motorcycle, the windshield assembly comprising:

a windshield; and at least one clamp coupled to the windshield, the clamp securable to a portion of the motorcycle in a secured condition, and the clamp releasable from the portion of the motorcycle in an unsecured condition, the clamp including a receiving portion capable of at least partially receiving the portion of the motorcycle, and a linkage that is movably connected to the receiving portion for movement between first and second positions;

wherein the clamp is in the unsecured condition when the linkage is in the first position, wherein the clamp is in the secured condition when the linkage is in the second position, and wherein a first side of the portion of the motorcycle is received by the receiving portion and secured by the linkage when the clamp is in the secured condition such that the receiving portion and the linkage do not interlock with each other about an opposite side of the portion of the motorcycle to secure the portion of the motorcycle within the clamp.

2. The windshield assembly of claim 1, wherein the linkage includes a lever movable to actuate the linkage between the first and second positions.

3. The windshield assembly of claim 1, wherein the clamp is biased toward the unsecured condition when the linkage is over center in one direction.

4. The windshield assembly of claim 3, wherein the clamp is biased toward the secured condition when the linkage is over center in an opposite direction.

5. The windshield assembly of claim 1, wherein the linkage includes a link movable by the motorcycle to actuate the linkage from the first position toward the second position when the motorcycle is at least partially received within the clamp.

6. The windshield assembly of claim 1, wherein the linkage includes a jaw movable into contact with the motorcycle when the linkage is moved to the second position, and movable out of contact with the motorcycle when the linkage is moved to the first position.

7. The windshield assembly of claim 6, wherein the clamp includes a housing, and wherein the receiving portion is part of the housing.

8. The windshield assembly of claim 7, wherein the receiving portion is arcuate, and wherein the jaw includes an arcuate portion, the arcuate portion capable of at least partially receiving the portion of the motorcycle when the linkage is moved from the first to the second position.

9. The windshield assembly of claim 1, wherein the clamp includes a housing, and wherein the linkage includes:

a link pivotably coupled to the housing about a first axis, a lever pivotably coupled to the link about a second axis, and a jaw pivotably coupled to the housing about a third axis and pivotably coupled to the lever about a fourth axis.

10. A method of making a windshield assembly for a motorcycle, the method comprising:

providing a windshield;

coupling a clamp to the windshield, wherein the clamp is securable to a portion of the motorcycle in a secured condition, and releasable from the portion of the motorcycle in an unsecured condition, the clamp including a receiving portion and a linkage that is movably connected to the receiving portion for movement between first and second positions;

wherein the clamp is in the unsecured condition when the linkage is in the first position, wherein the clamp is in the secured condition when the linkage is in the second position, wherein the receiving portion receives a first side of the portion of the motorcycle in the secured condition, and wherein the receiving portion and the linkage do not interlock with each other about an opposite side of the portion of the motorcycle in the secured condition.

11. The method of claim 10, wherein the linkage includes a lever movable to actuate the linkage between the first and second positions.

12. The method of claim 10, wherein the clamp is biased toward the unsecured condition when the linkage is over center in one direction.

13. The method of claim 12, wherein the clamp is biased toward the secured condition when the linkage is over center in an opposite direction.

14. The method of claim 10, wherein the linkage includes a link movable by the motorcycle to actuate the linkage from the first position toward the second position when the motorcycle is at least partially received within the clamp.

15. The method of claim 10, wherein the linkage includes a jaw movable into contact with the motorcycle when the linkage is moved to the second position, and movable out of contact with the motorcycle when the linkage is moved to the first position.

16. The method of claim 15, wherein the clamp includes a housing, and wherein the housing includes the receiving portion.

17. The method of claim 16, wherein the receiving portion is arcuate and capable of at least partially receiving the portion of the motorcycle, and wherein the jaw includes an arcuate portion, the arcuate portion capable of at least partially receiving the portion of the motorcycle when the linkage is moved from the first to the second position.

18. The method of claim 10, wherein the clamp includes a housing, and wherein the linkage includes:
 a link pivotably coupled to the housing about a first axis,
 a lever pivotably coupled to the link about a second axis, and
 a jaw pivotably coupled to the housing about a third axis and pivotably coupled to the lever about a fourth axis.

19. A method of securing a windshield assembly to a motorcycle, the method comprising:
 providing a windshield assembly including a windshield and at least one clamp coupled to the windshield, the clamp including a receiving portion and a linkage, the linkage being movably connected to the receiving portion; and
 moving the linkage to receive a first side of a portion of the motorcycle within the receiving portion and to secure the windshield assembly to a portion of the motorcycle such that the linkage does not interlock with the receiving portion about an opposite side of the portion of the motorcycle.

20. The method of claim 19 further comprising:
 moving a lever; and
 actuating the linkage with the lever between the first and second positions.

21. The method of claim 19 further comprising biasing the clamp toward an unsecured condition when the linkage is over center in one direction.

22. The method of claim 21 further comprising biasing the clamp toward a secured condition when the linkage is over center in the opposite direction.

23. The method of claim 19, further comprising actuating the linkage from the first toward the second position with the portion of the motorcycle when the portion of the motorcycle is at least partially received within the clamp.

24. The method of claim 19, wherein receiving the portion of the motorcycle within the receiving portion includes receiving the portion of the motorcycle within a housing portion of the clamp.

25. The method of claim 19, wherein the portion of the motorcycle includes at least one of handlebars, fork tubes, and a triple tree.

* * * * *